(12) United States Patent
Crane et al.

(10) Patent No.: US 9,163,852 B2
(45) Date of Patent: *Oct. 20, 2015

(54) BRACKET-ACTIVE GRILLE AND ACTUATOR

(71) Applicant: Magna International Inc., Aurora (CA)

(72) Inventors: Michael W. Crane, Oakland Township, MI (US); Thomas E Cobb, Harrison Township, MI (US); Anthony J. Povinelli, Romeo, MI (US); James J. Kowalski, Lake Orion, MI (US); Stephen R. Roddy, Harrison Township, MI (US)

(73) Assignee: Magna International Inc., Aurora (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/450,608

(22) Filed: Aug. 4, 2014

(65) Prior Publication Data

US 2014/0342656 A1  Nov. 20, 2014

Related U.S. Application Data

(63) Continuation of application No. 13/373,493, filed on Nov. 16, 2011, now Pat. No. 8,827,233.

(60) Provisional application No. 61/456,984, filed on Nov. 16, 2010.

(51) Int. Cl.
    *F16M 1/00*   (2006.01)
    *F24F 13/20*  (2006.01)
    *B60K 11/08*  (2006.01)

(52) U.S. Cl.
    CPC ............... *F24F 13/20* (2013.01); *B60K 11/085* (2013.01)

(58) Field of Classification Search
    CPC combination set(s) only.
    See application file for complete search history.

(56) References Cited

U.S. PATENT DOCUMENTS

| | | | |
|---|---|---|---|
| 5,090,502 | A | 2/1992 | Inoue et al. |
| 5,295,653 | A | 3/1994 | Miyazaki et al. |
| 5,488,259 | A | 1/1996 | Cho |
| 5,561,338 | A | 10/1996 | Roberts et al. |
| 5,672,931 | A | 9/1997 | Kiss et al. |
| 5,878,990 | A | 3/1999 | Delire |
| 6,065,733 | A | 5/2000 | Correa et al. |
| 6,179,446 | B1 | 1/2001 | Sarmadi |
| 6,260,814 | B1 | 7/2001 | Mathews |
| 6,716,003 | B2 | 4/2004 | Chen |
| 7,021,599 | B2 | 4/2006 | DeGrazia et al. |
| 7,182,306 | B2 | 2/2007 | Tsutsumida et al. |
| 7,273,358 | B2 | 9/2007 | Wang |
| 7,546,998 | B2 | 6/2009 | Chen |
| 7,690,607 | B2 | 4/2010 | Garmyn |
| 7,810,466 | B2 | 10/2010 | Preimesberger et al. |
| 7,976,290 | B2 | 7/2011 | Wang |

(Continued)

*Primary Examiner* — Monica Millner
(74) *Attorney, Agent, or Firm* — Warn Partners, P.C.

(57) ABSTRACT

A modular a bracket which forms a cavity such that the bracket surrounds and supports an actuator. In one embodiment, the bracket is made of multiple pieces and also connects together without the use of fasteners. The pieces are connected together through the use of several attachment features, with a portion of each of the attachment features integrally formed as part of each half. The bracket also includes a plurality of alignment features integrally formed as part of the bracket. The alignment features support and properly position the actuator within the cavity. The design of the bracket reduces and simplifies design and tooling, and also has minimal components and fasteners, which also simplifies and reduces labor time.

33 Claims, 13 Drawing Sheets

(56) References Cited

U.S. PATENT DOCUMENTS

| | | |
|---|---|---|
| 8,342,477 B2 | 1/2013 | Kneshtel, Jr. et al. |
| 8,523,136 B2 | 9/2013 | Patel et al. |
| 8,827,233 B2 * | 9/2014 | Crane et al. ........... 248/674 |
| 2010/0253188 A1 | 10/2010 | Koyama |
| 2011/0121157 A1 | 5/2011 | Park |
| 2011/0285228 A1 | 11/2011 | Umehara et al. |
| 2012/0119059 A1 | 5/2012 | Crane et al. |

* cited by examiner

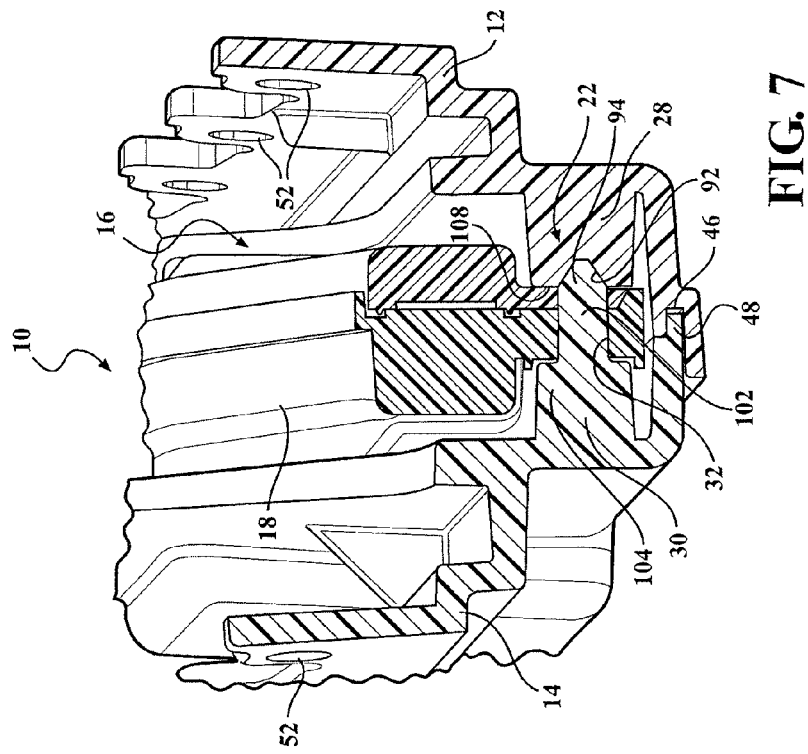
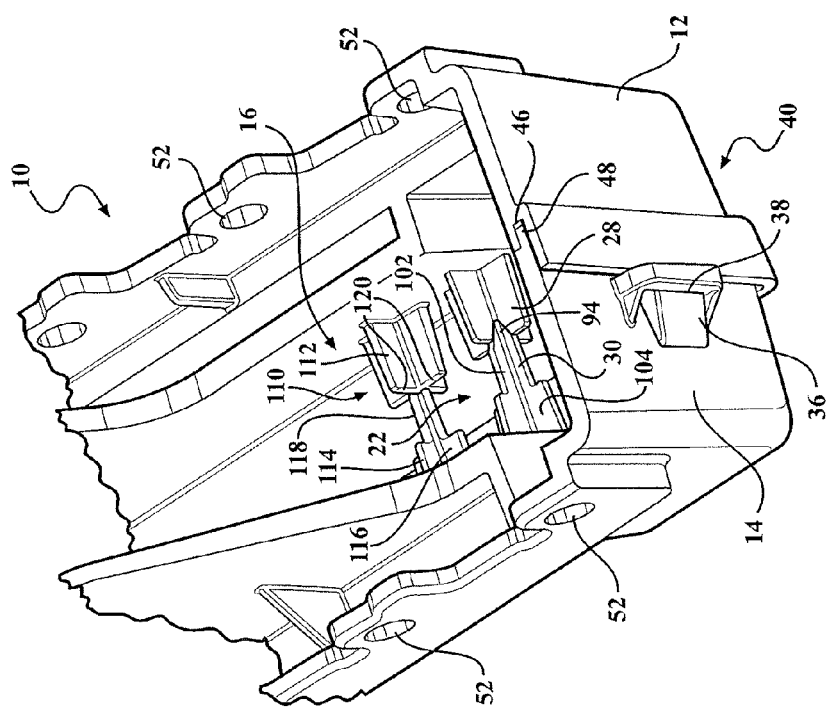

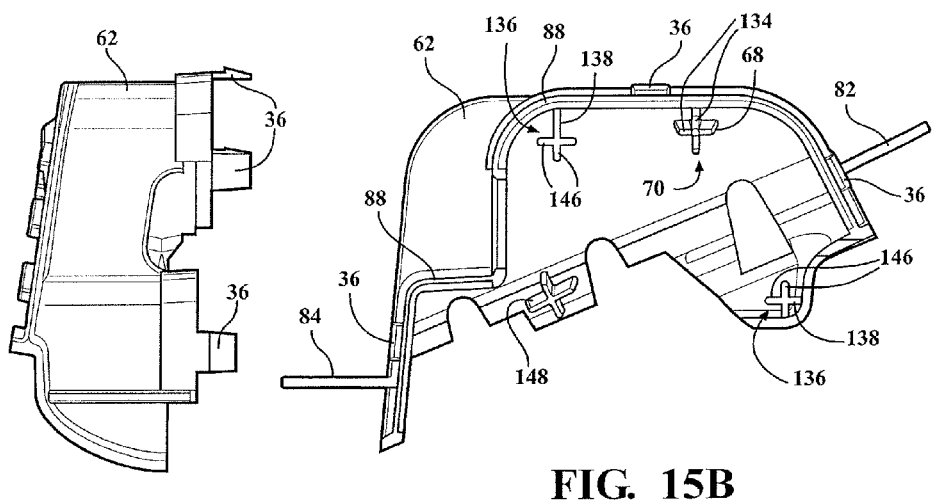
FIG. 15A
FIG. 15B
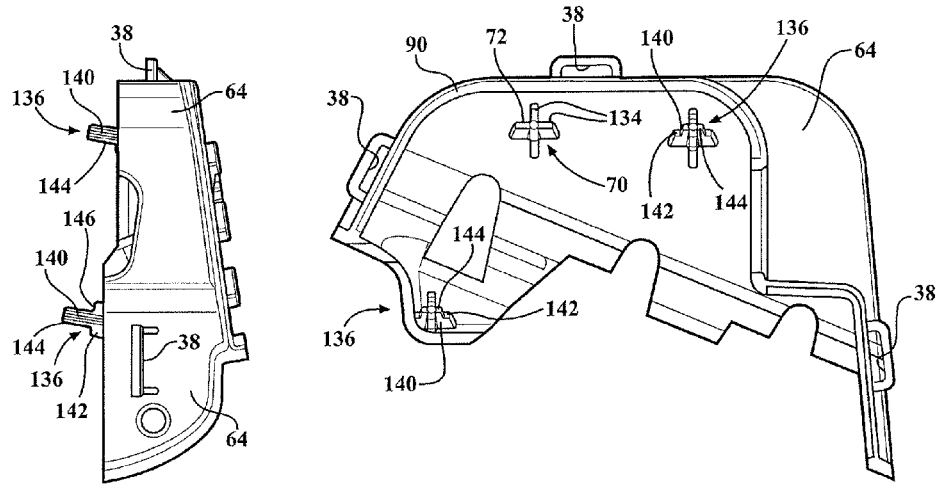
FIG. 16A
FIG. 16B

BRACKET-ACTIVE GRILLE AND ACTUATOR

CROSS REFERENCE TO RELATED APPLICATIONS

This application is a continuation of U.S. patent application Ser. No. 13/373,493, filed Nov. 16, 2011. This application claims priority to U.S. Provisional Patent Application Ser. No. 61/456,984, filed Nov. 16, 2010. The disclosures of the above applications are incorporated herein by reference.

FIELD OF THE INVENTION

The present invention relates to a bracket used for supporting an actuator and a plurality of louvers in a grille having active ducting.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat in order to maintain an optimal operating temperature.

However, it is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

Furthermore, components designed to provide optimal cooling when the vehicle is new may operate differently after the vehicle has accumulated significant mileage. This may occur due to various weather conditions, changes in the way the vehicle is operated in response to different drivers, or wear and tear on the vehicle components and other components. All of these factors may affect or change the operation of the components over time as the vehicle accumulates mileage. Also, with many current cooling systems, the airflow generated from the forward motion of a vehicle is not efficiently used to cool the various components of the vehicle. Rather, many of the components of a vehicle cause poor airflow which leads to aerodynamic inefficiencies.

One particular attempt at this type of cooling is the use of louvers which are moveable between various positions to manipulate the air flow around the various components underneath the hood of the automobile. These louvers are typically controlled by a type of actuator, either mechanical or electrical, which is connected to the louvers, and provides for simultaneous actuation of the louvers. However, the actuator must be connected to the grille, or a location in proximity to the grille, to provide for actuation of each of the louvers. Connection of the actuator typically includes some type of fastener or other device for connecting the actuator to the grille.

Accordingly, there exists a need for a actuator that is connectable to a grille or other component which is simplified and uses a minimal amount of fasteners.

SUMMARY OF THE INVENTION

The present invention is directed to a bracket which forms a cavity such that the bracket surrounds and supports an actuator. In one embodiment, the bracket is made of multiple pieces and also connects together without the use of fasteners. The pieces are connected together through the use of several attachment features, with a portion of each of the attachment features integrally formed as part of each half.

The bracket also includes a plurality of alignment features integrally formed as part of the bracket. The alignment features support and properly position the actuator within the cavity. The design of the present invention reduces and simplifies design and tooling, and also has minimal components and fasteners, which also simplifies and reduces labor time.

In one embodiment, the present invention is a bracket for receiving an actuator used to operate an active grille, where the bracket includes a first half, a second half selectively connected to the first half, and a plurality of attachment features for connecting the first half to the second half. A cavity formed when the first half is connected to the second half, and an actuator disposed in the cavity operable for actuating one or more louvers. The bracket also includes a first plurality of alignment features, and a second plurality of alignment features for providing proper alignment of the actuator in the cavity. A groove is formed as part of the first half, and a lip formed as part of the second half such that the lip is at least partially disposed in the groove when the first half is connected to the second half.

The bracket also has a plurality of side apertures operable for supporting the louvers operated by the actuator. A portion of the plurality of side apertures formed as part of the first half, and a portion of the side apertures formed as part of the second half.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 is a third enlarged perspective view of alignment features and attachment features formed as part of a bracket used as part of an active ducting system, according to a first embodiment of the present invention;

FIG. 7 is a sectional view of a bracket used as part of an active ducting system, according to a first embodiment of the present invention;

FIG. 15A is a front view of the first half of a bracket used in an active ducting system, according to a second embodiment of the present invention;

FIG. 15B is a side view of the inside of the first half of a bracket used in an active ducting system, according to a second embodiment of the present invention FIG. 16A is a front view of the second half of a bracket used in an active ducting system, according to a second embodiment of the present invention;

FIG. 16B is a side view of the inside of a second half of a bracket, used in an active ducting system, according to a second embodiment of the present invention;

DETAILED DESCRIPTION OF THE PREFERRED EMBODIMENTS

Figure 1:
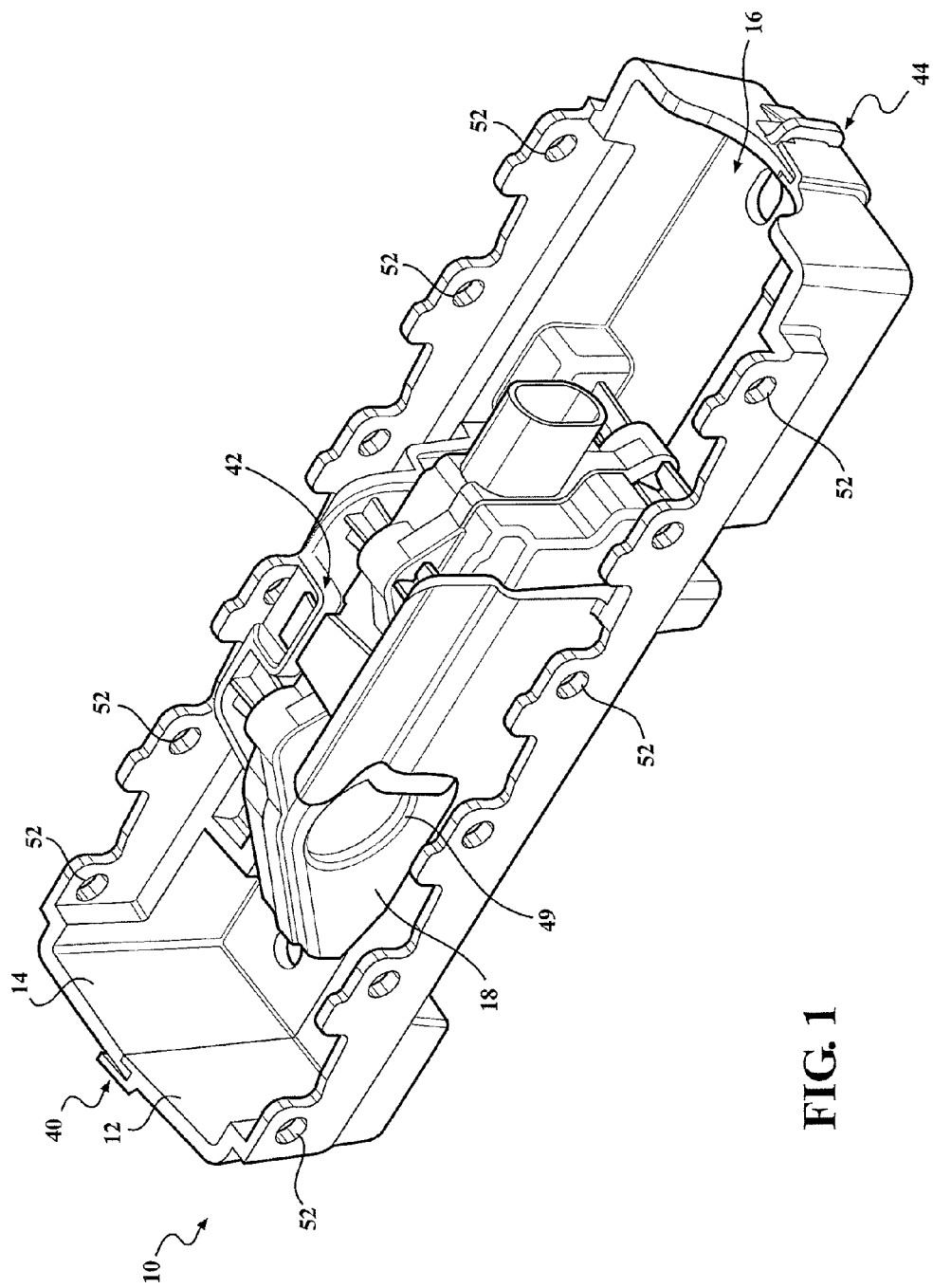
FIG. 1 is an isometric view of a bracket used as part of an active ducting system, according to a first embodiment of the present invention.
Figure 3:
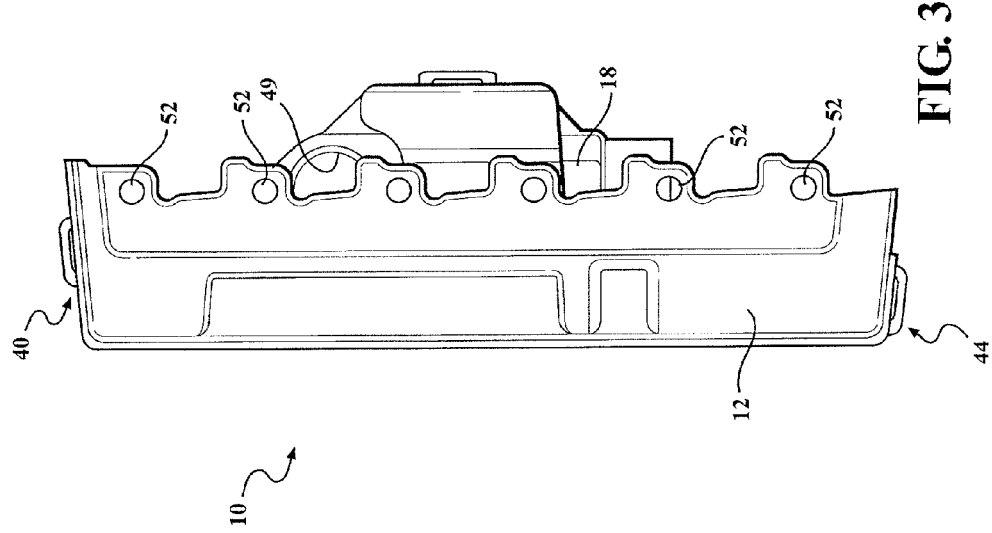
FIG. 3 is a side view of a bracket used as part of an active ducting system, according to a first embodiment of the present invention.
Figure 2:
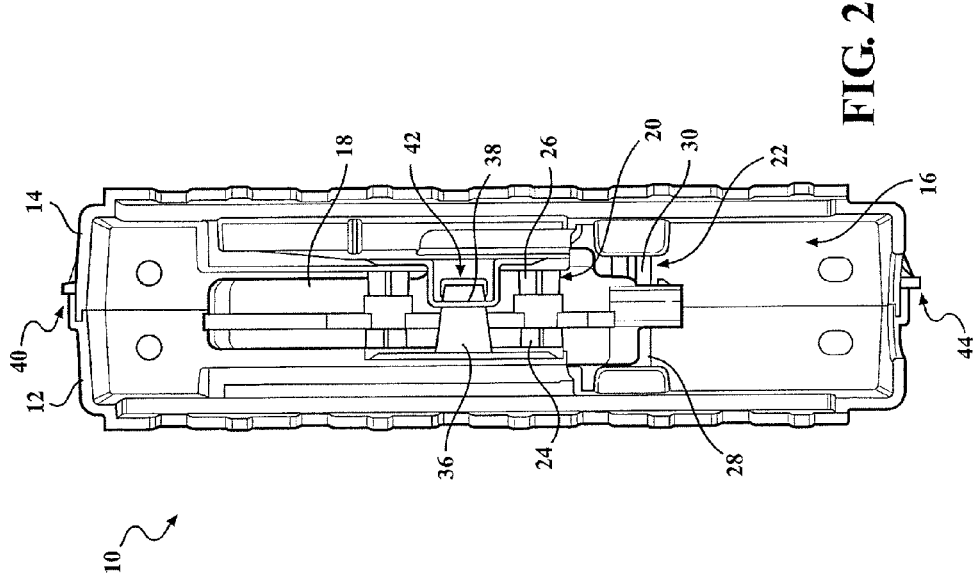
FIG. 2 is a rear view of a bracket used as part of an active ducting system, according to a first embodiment of the present invention.
Figure 4:
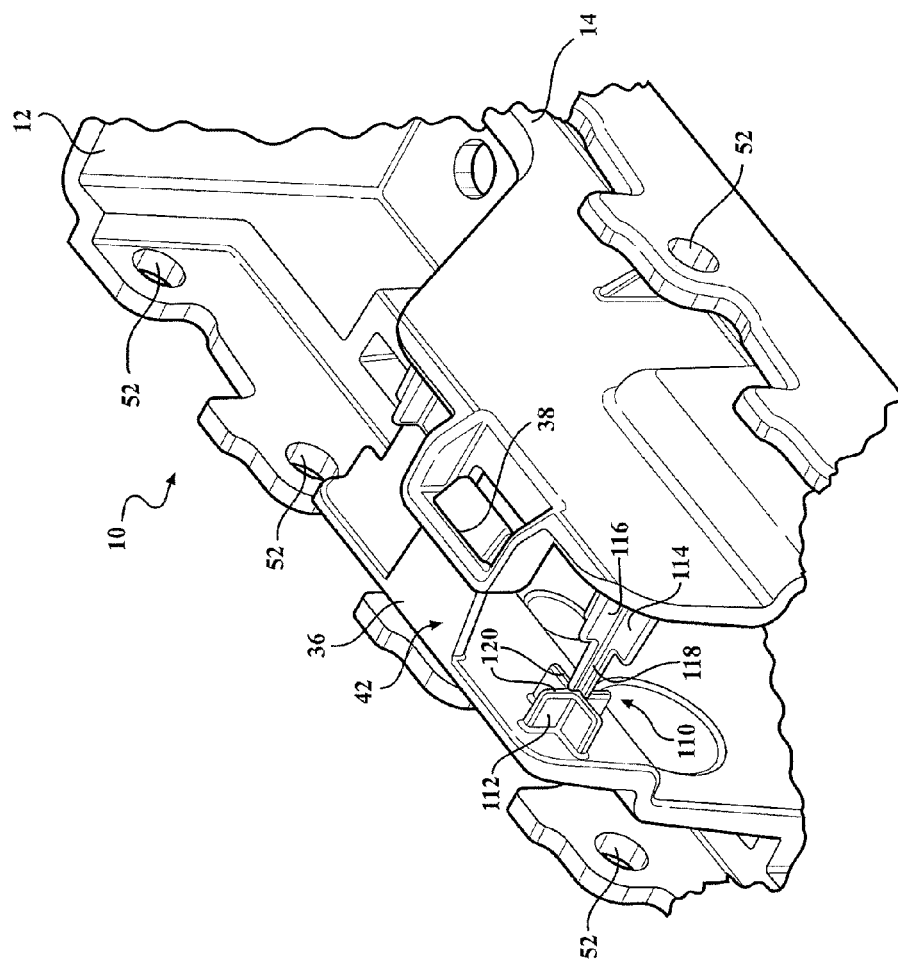
FIG. 4 is an enlarged perspective view of alignment features and attachment features formed as part of a bracket used as part of an active ducting system, according to a first embodiment of the present invention.
Figure 5:
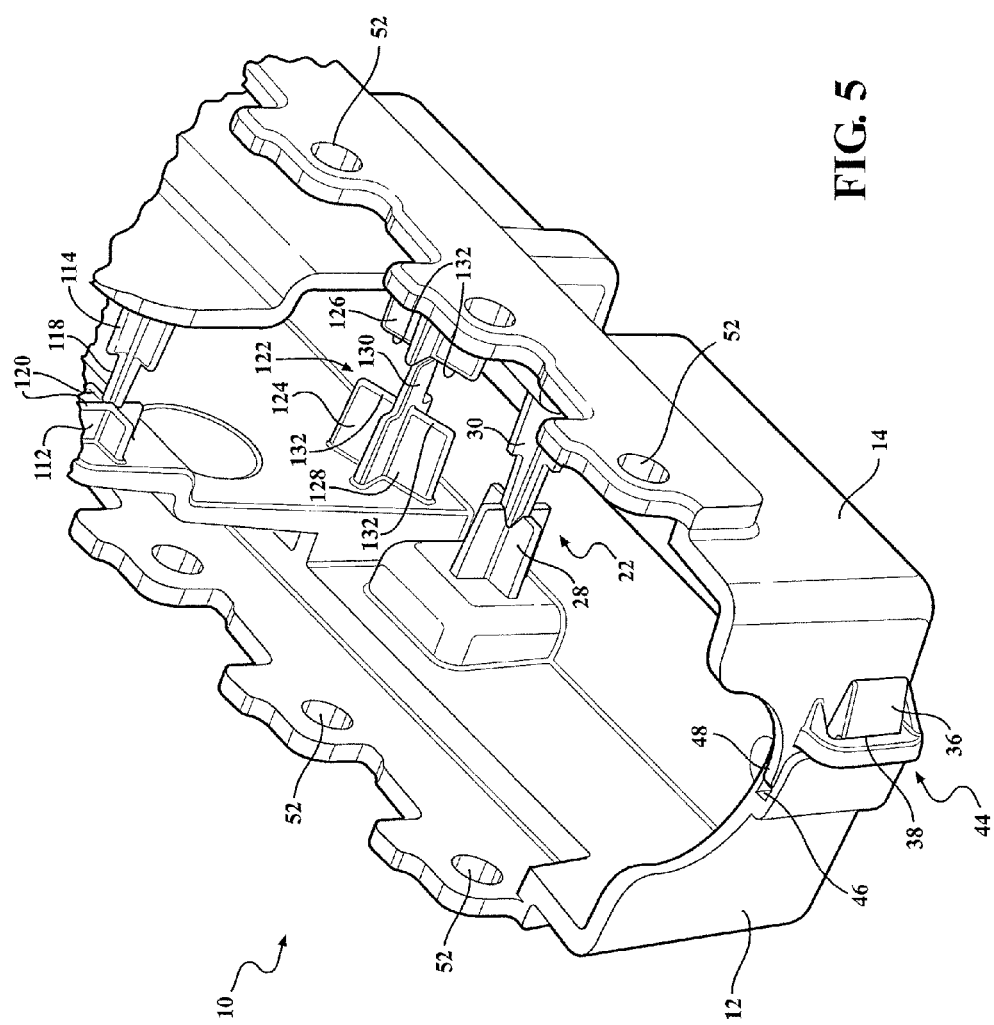
FIG. 5 is a second enlarged perspective view of alignment features and attachment features formed as part of a bracket used as part of an active ducting system, according to a first embodiment of the present invention.
Figure 8:
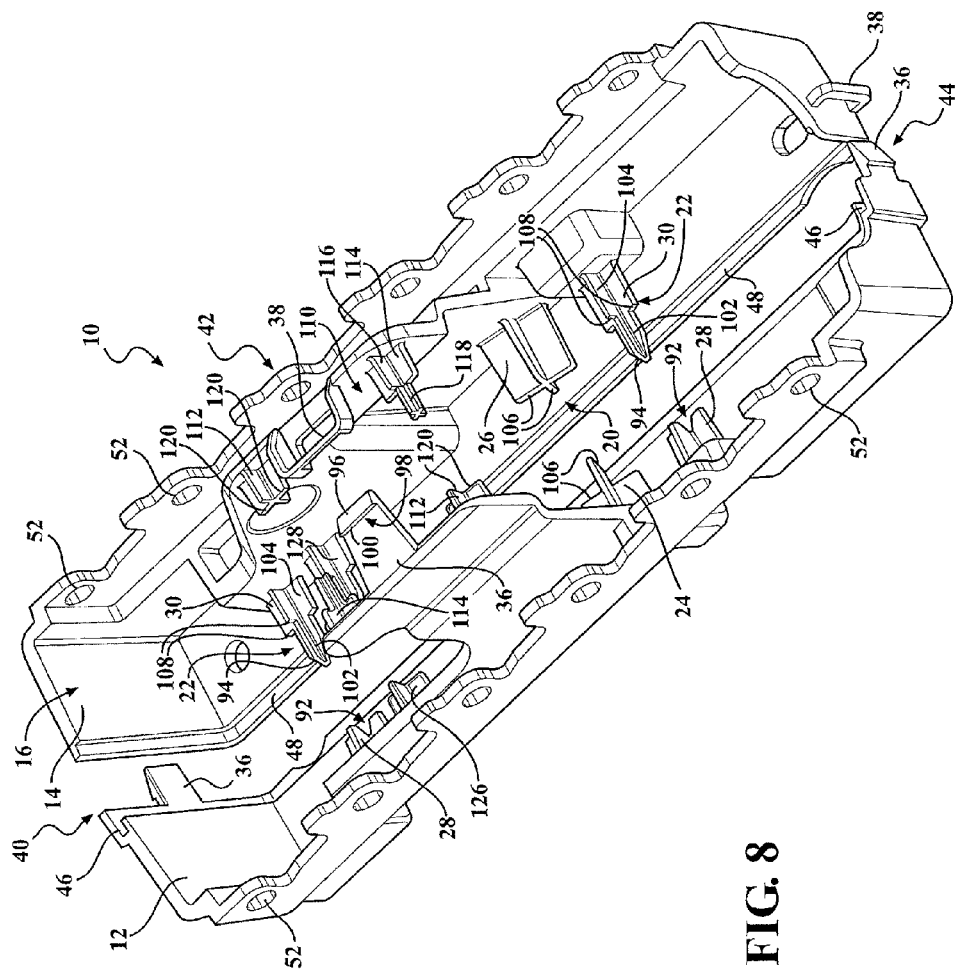
FIG. 8 is a perspective view of a bracket used as part of an active ducting system, with each half of the bracket separated from one another, according to a first embodiment of the present invention.

The following description of the preferred embodiment(s) is merely exemplary in nature and is in no way intended to limit the invention, its application, or uses.

A first embodiment of a bracket according to the present invention is shown in FIGS. 1-8 generally at 10. The bracket 10 includes a first piece 12 and a second piece 14, which when connected together form a cavity, shown generally at 16, for receiving an actuator 18. In this embodiment, each piece 12,14 represents half of the bracket 10, but it is within the scope of the invention that the bracket 10 may be made of a single piece, or more than two pieces.

The bracket 10 also includes a plurality of alignment features, some of which are a first plurality of alignment features, shown generally at 20, and some of which are a second plurality of alignment features, shown generally at 22. Each of the first plurality of alignment features 20 is made up of a first projection 24 formed as part of the first piece 12 of the bracket 10, and a second projection 26 formed as part of the second piece 14 of the bracket 10. In this embodiment, the first projection 24 has an X-shaped cross section which is in alignment with the second projection 26, which also has an X-shaped cross section which corresponds to the X-shaped cross section of the first projection 24. While the X-shaped cross sections have been described, it is within the scope of the invention that other types of cross sections may be used.

Each of the second alignment features 22 includes a third projection 28 formed as part of the first piece 12 of the bracket 10, and a fourth projection 30 formed as part of the second piece 14 of the bracket 10. In this embodiment, the third projection 28 is made of two flanges creating an X-shaped cross section, and includes a recessed portion, shown generally at 92, where the two flanges intersect. The recessed portion 92 receives a tapered portion 94 integrally formed with a narrow portion 102, and the narrow portion 102 is integrally formed with a wide portion 104. The tapered portion 94, narrow portion 102, and wide portion are all formed as part of the fourth projection 30. The fourth projection 30 also has an X-shaped cross section. While the third projection 28 and fourth projection 30 have been described as having X-shaped cross sections, it is within the scope of the invention that other cross sections may be used.

The actuator 18 includes a plurality of apertures 32 which, along with the alignment features 20,22, retain the actuator 18 within the cavity 16. More specifically, when the pieces 12,14 of the bracket 10 are connected together, the first projection 24 formed as part of the first piece 12 and the second projection 26 formed as part of the second piece 14 contact and support the sides of the actuator 18. The first projection 24 and second projection 26 both include a first plurality of support surfaces 106 which rest against the sides of the actuator 18, supporting the actuator 18.

Additionally, the third projection 28 formed as part of the first piece 12 contacts the fourth projection 30 formed as part of the second piece 14 such that the narrow portion 102 of the fourth projection 30 extends into a second of the apertures 32, and the tapered portion 94 is received into the recessed area 92 of the third projection 28. The third projection 28 and includes a second plurality of support surfaces 108, which when the bracket 10 and actuator 18 are assembled rest against the sides of the actuator 18 in proximity to the apertures 32, best seen in FIG. 7.

The bracket 10 also includes a third plurality of alignment features, shown generally at 110, which include a fifth projection 112 and a sixth projection 114. The sixth projection 114 also includes a wide portion 116 and a narrow portion 118, but does not have a tapered portion. When the bracket 10 is assembled, the narrow portion 118 extends into one of the apertures 32 of the actuator 18, and contacts the fifth projection 112, and provides support for the actuator 18. The fifth projection 112 also includes a third plurality of support surfaces 120 which rest against the actuator 18 to support the actuator 18 when the bracket 10 and actuator 18 are assembled. The third plurality of alignment features 110 provide an anti-rotation function to prevent the actuator 18 from rotating when assembled with the bracket 10. While it has been shown that the fifth projection 112 and the sixth projection 114 have X-shaped cross sections, it is within the scope of the invention that other types of cross sections may be used.

The bracket 10 also optionally includes a fourth plurality of alignment features, shown generally at 122, which include a seventh projection 124 and an eighth projection 126. The seventh projection 124 also includes a wide portion 128, and a single flange 130 extending away from the wide portion 128, where the single flange 130 contacts the eighth projection 126 when the bracket 10 is assembled. The fourth plurality of alignment features 122 may be incorporated into the bracket 10 when the bracket 10 is used for a different type of actuator. Furthermore, each of the projections 124,126 may also include a fourth plurality of support surfaces 132 which may be positioned against the actuator 18 when the bracket 10 and actuator 18 are assembled together. While it has been shown that the seventh projection 124 and the eighth projection 126 have X-shaped cross sections, it is within the scope of the invention that other types of cross sections may be used.

The bracket 10 also includes a plurality of attachment features, each of which includes a projection 36 operable for being selectively inserted into a slot 38 to provide a "snap-fit" connection. The slot 38 is formed as part of the first piece 12, and the projection 36 is formed as part of the second piece 14. Each projection 36 includes an angled surface 96 and a notch, shown generally at 98, which includes a retaining surface 100. As the first piece 12 is assembled to the second piece 14, the projection 36 is inserted through the slot 38 such that the projection 36 deflects as the angled surface 96 contacts the inner surface of the slot 38. Once the projection 36 is inserted into the slot 38 far enough such that the notch 98 has passed through the slot 38, the projection 36 no longer deflects, and the retaining surface 100 retains the projection 36 in the slot 38, best shown in FIGS. 1-6. In this embodiment, there are three attachment features, but it is within the scope of the invention that more or less attachment features may be used. More specifically, there is an upper attachment feature, shown generally at 40, a middle attachment feature, shown generally at 42, and a lower attachment feature, shown generally at 44.

To further provide proper alignment between each piece 12,14 of the bracket 10, there is a groove 46 formed as part of the first piece 12 which receives a lip 48 formed as part of the second piece 14 when the pieces 12,14 are connected to one another. Both the groove 46 and lip 48 extend almost the entire periphery of the respective pieces 12,14, providing additional rigidity for the connection between the pieces 12,14.

Figures 11, 12A:
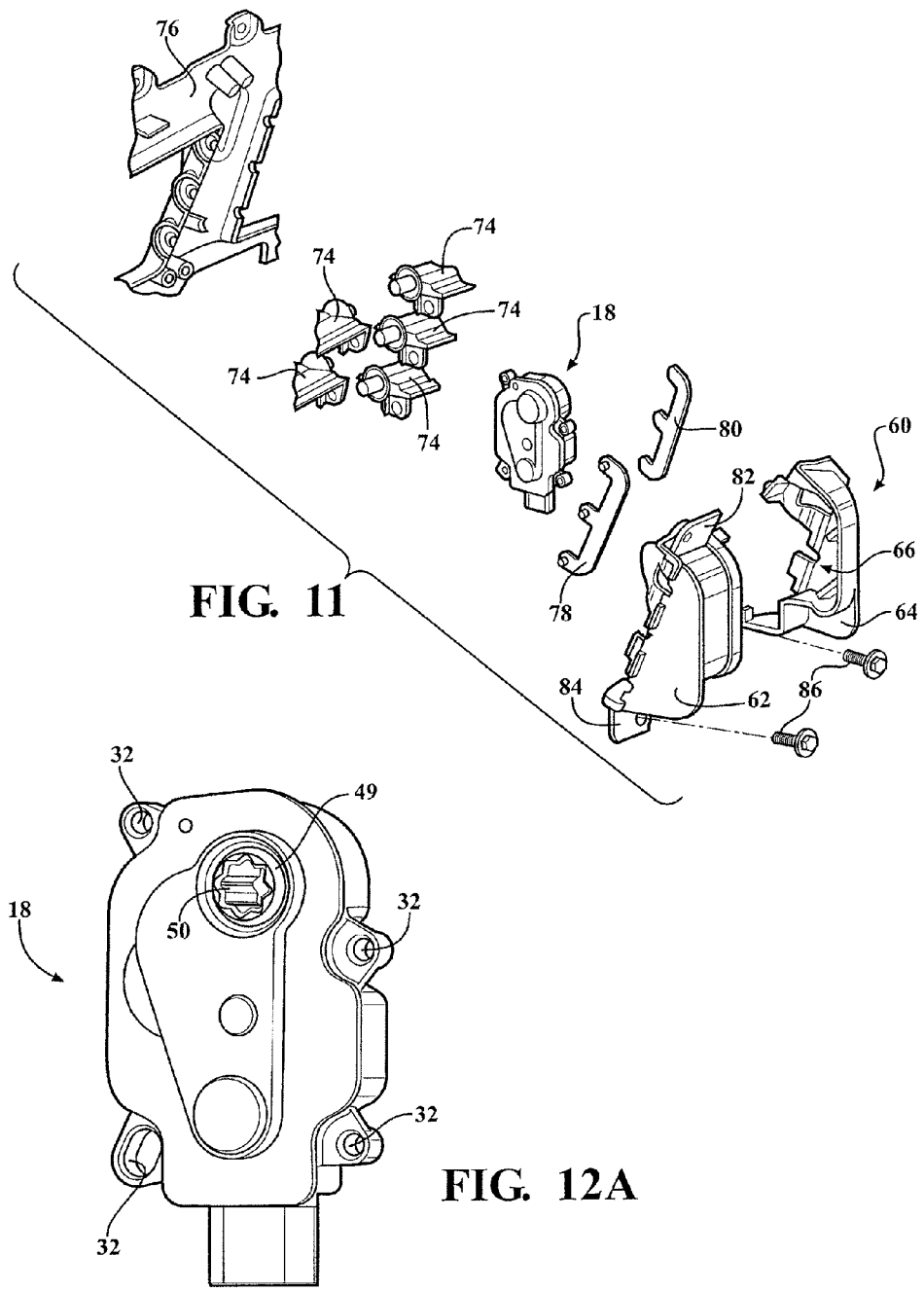
FIG. 11 is an exploded view of an active ducting system having a bracket, according to a second embodiment of the present invention.
FIG. 12A is a first side view of an actuator used in an active ducting system having a bracket, according to a second embodiment of the present invention.
Figure 12B:
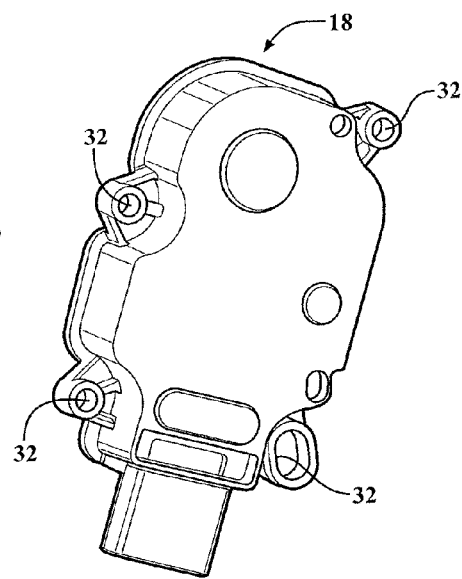
FIG. 12B is a second side view of an actuator used in an active ducting system having a bracket, according to a second embodiment of the present invention.
Figure 13A:
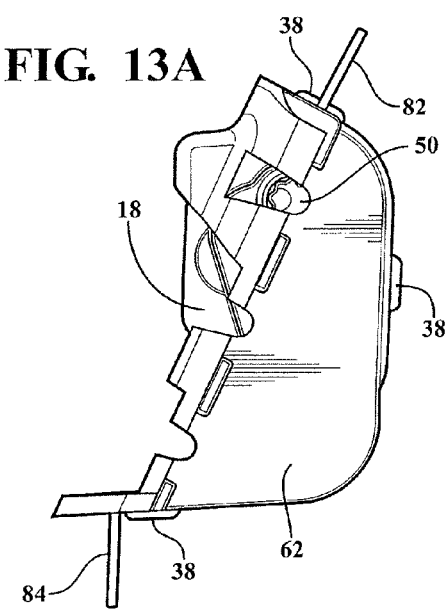
FIG. 13A is a first side view of a bracket used in an active ducting system, according to a second embodiment of the present invention.
Figure 13B:
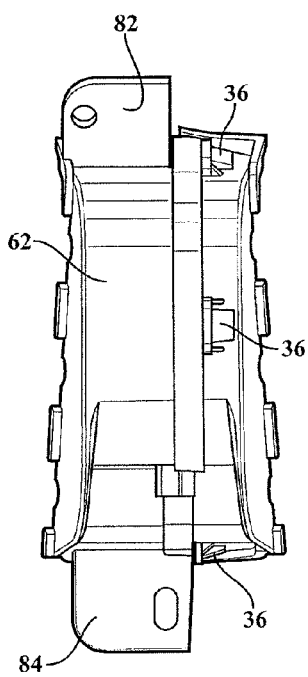
FIG. 13B is a rear view of a bracket used in an active ducting system, according to a second embodiment of the present invention.
Figure 13C:
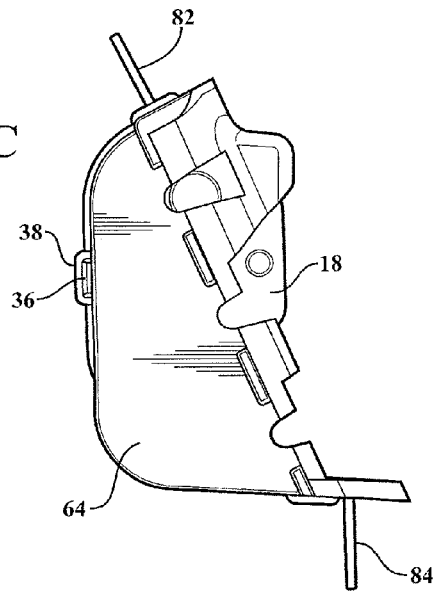
FIG. 13C is a second side view of a bracket used in an active ducting system, according to a second embodiment of the present invention.

The actuator 18 includes an aperture 49 in which a star-shaped gear, shown generally at 50 in FIG. 12A, is exposed. The gear 50 connects to one of a plurality of louvers, and the louvers are linked together such that the louvers move in unison. The louvers are mounted into a plurality of side apertures 52, where some of the side apertures 52 are formed as part of the first piece 12, and some of the side apertures 52 are formed as part of the second piece 14. The gear 50 may be connected to an electric motor or the like, and the motor may be interfaced with the vehicle's CPU.

The bracket 10 functions to support the actuator 18 in space without the use of additional fasteners. The first piece 12 is formed as a single component, and the second piece 14 is formed as a single component, and the pieces 12,14 are joined together without any separate fasteners. The alignment features 20,22,110,122 and the attachment features 40,42,44 are formed as part of each piece 12,14 of the bracket 10. The bracket 10 simplifies design and tooling, and also has minimal components and fasteners, which also simplifies and reduces labor time.

Another embodiment of the present invention is shown in FIGS. 9-19, where like numbers refer to like elements. In this embodiment, the bracket, generally shown at 60, also includes a first piece 62 and a second piece 64, and the pieces 62,64 combine to form a cavity, generally shown at 66. The cavity 66 receives the actuator 18, which is the same actuator 18 described in the first embodiment.

The first piece 62 includes a first locator projection 68 which is part of a first type of alignment feature, shown generally at 70, which is used with a second locator projection 72 which is also part of the alignment feature 70, to support the actuator 18. The second locator projection 72 is part of the second piece 64. In one embodiment, each of the projections 68,72 also include support surfaces 134 which are positioned against the actuator 18 to support the actuator 18 in the cavity 66, in alternate embodiment, one or both of the projections 68,72 extend into one of the apertures 32 such that the projections 68,72 contact one another, supporting the actuator 32 in the cavity 66.

The bracket 60 in this embodiment also has a second type of alignment feature, shown generally at 136, which has a third locator projection 138 and a fourth locator projection 140. Each of the fourth locator projections 140 includes a wide portion 142 integrally formed with a narrow portion 144, and each of the narrow portions 144 extends through a corresponding aperture 32 of the actuator 18, and contact the third locator projection 138, securing the position of the actuator 18 within the cavity 66. The wide portions 142 of the fourth locator projection 140 and the third projections 138 also have support surfaces 146 which rest against the actuator 18 to support the actuator 18 when the bracket 60 and actuator 18 are assembled together.

The second embodiment of the bracket 60 is not limited to the use of the first locator projection 68 used in combination with the second locator projection 72, or the third locator projection 138 in combination with the fourth locator projection 140. As an alternate embodiment, the fourth projection 140 formed as part of the second piece 64 may extend through one of the apertures 32 and contact a boss 150 formed as part of the first piece 62, shown in FIG. 18. In yet another alternative embodiment, the third locator projection 138 may extend through an aperture 32 in the actuator 32 and contact a boss 152 formed as part of the second piece 64.

There is also a locating feature 148 formed as part of the first piece 62. The locating feature 148 extends into one of the apertures 32 formed as part of the actuator 18, and contacts an inner surface of the second piece 64, to further locate the actuator 18 in the cavity 66 of the bracket 60.

The second embodiment of the bracket 60 also includes the attachment features having the projections 36 which are received into the slots 38 which function in a similar manner compared to the first embodiment, providing a snap-fit connection between the first piece 62 and the second piece 64. The projections 36 are formed as part of the first piece 62, and the slots 38 are formed as part of the second piece 64. Once the pieces 62,64 are connected, and then connected to the frame 76, the actuator 18 is completely concealed, and protected from the outside environment, eliminating exposure to debris and moisture.

Figure 10:
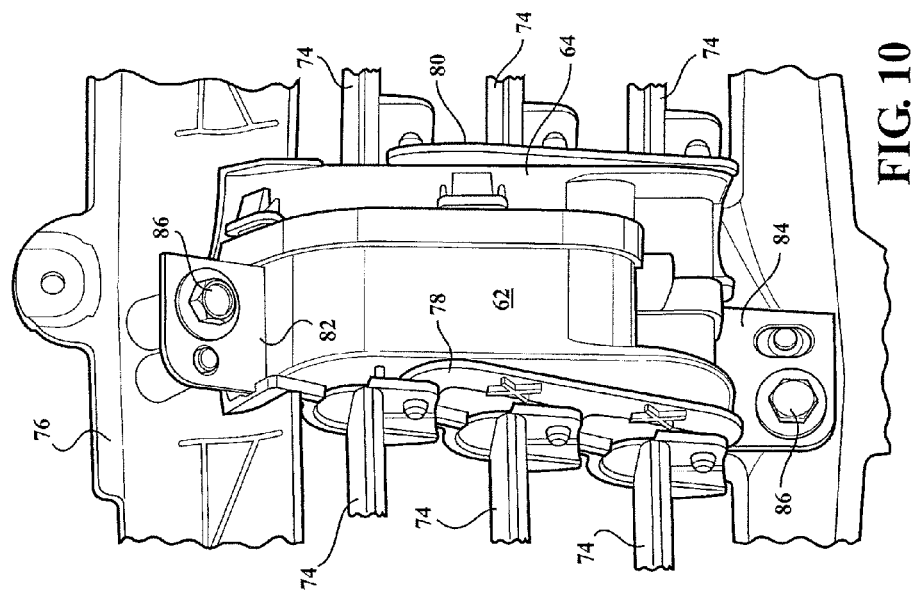
FIG. 10 is a rear view of an active ducting system having a bracket, according to a second embodiment of the present invention.
Figure 9:
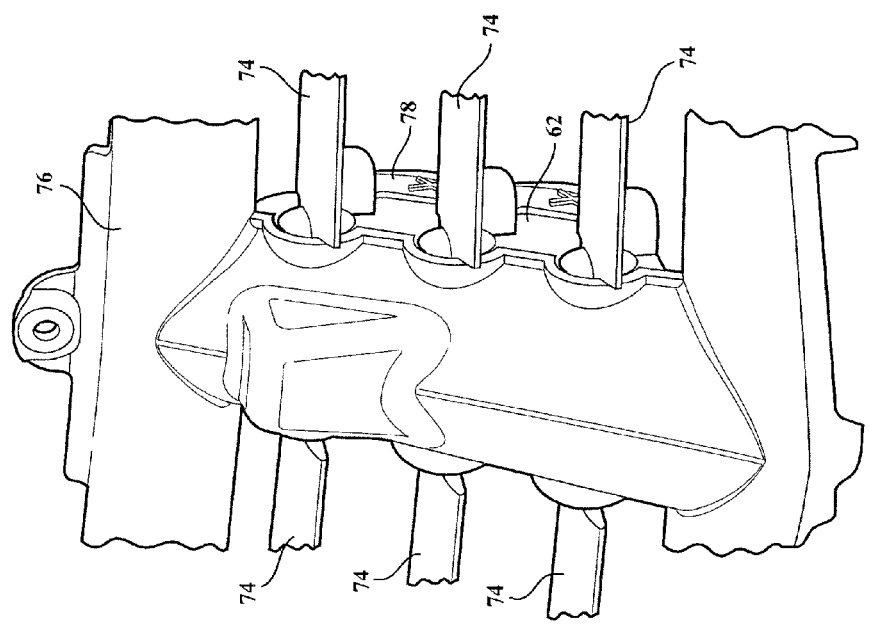
FIG. 9 is a front view of an active ducting system having a bracket, according to a second embodiment of the present invention.

As with the first embodiment, the gear 50 is connected to one of a plurality of louvers 74. In this embodiment, there are two sets of louvers 74, and portion of the louvers 74 are also mounted to one side of a frame 76, and another portion of the louvers 74 are mounted to the opposite side of the frame 76, best seen in FIGS. 9 and 10. To ensure that the louvers 74 rotate in unison, a first linkage 78 and a second linkage 80 are connected to the louvers 74 as shown in FIGS. 9-10, and the bottom two louvers 74 are also connected to one another. This allows for the gear 50 to simply be connected to the top louver 74 on the left-hand side of the frame 76 when looking at FIG. 10, but have control over all of the louvers 74 because of the connection between the louvers using the linkages 78,80. However, it is within the scope of the invention that the actuator 18 may have multiple gears 50 connected to more than one of the louvers 14. In an alternate embodiment, a gear 50 is exposed on each side of the actuator 18, and is connected to one of the louvers 14 on each side.

Also formed as part of the first piece 62 is an upper tab 82 and a lower tab 84, both of which are used along with a fastener, which in this embodiment is a bolt 86, to connect the bracket 60 to the frame 76.

Figure 14A:
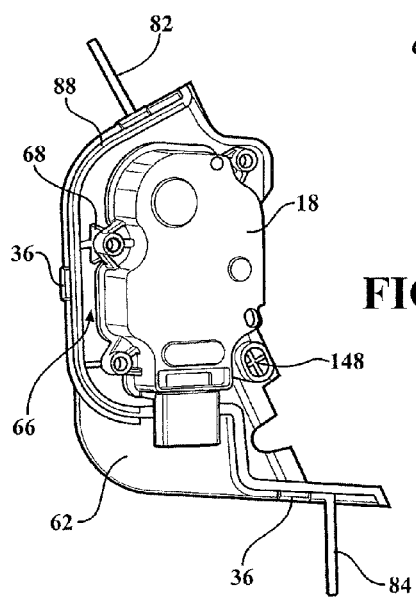
FIG. 14A is a side view of the inside of the first half of a bracket, with the actuator assembled to the bracket, used in an active ducting system, according to a second embodiment of the present invention.
Figure 14B:
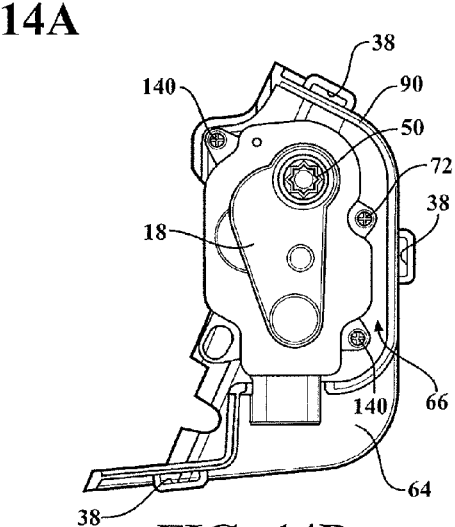
FIG. 14B is a side view of the inside of a second half of a bracket, with the actuator assembled to the bracket, used in an active ducting system, according to a second embodiment of the present invention.
Figure 17:
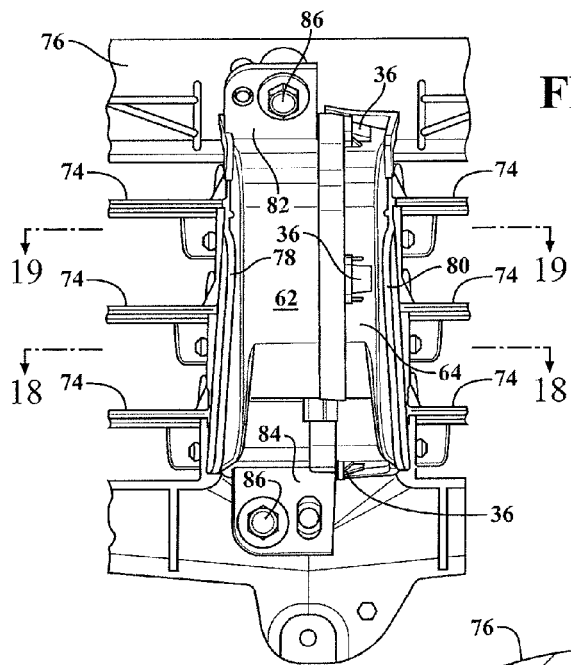
FIG. 17 is a second rear view of an active ducting system having a bracket, according to a second embodiment of the present invention.
Figure 18:
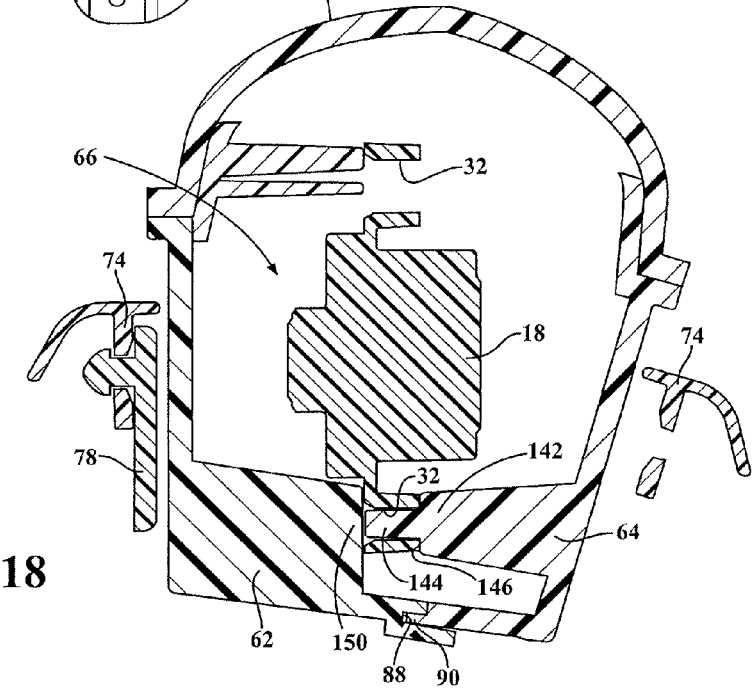
FIG. 18 is a sectional view taken along lines 18-18 of FIG. 17.
Figure 19:
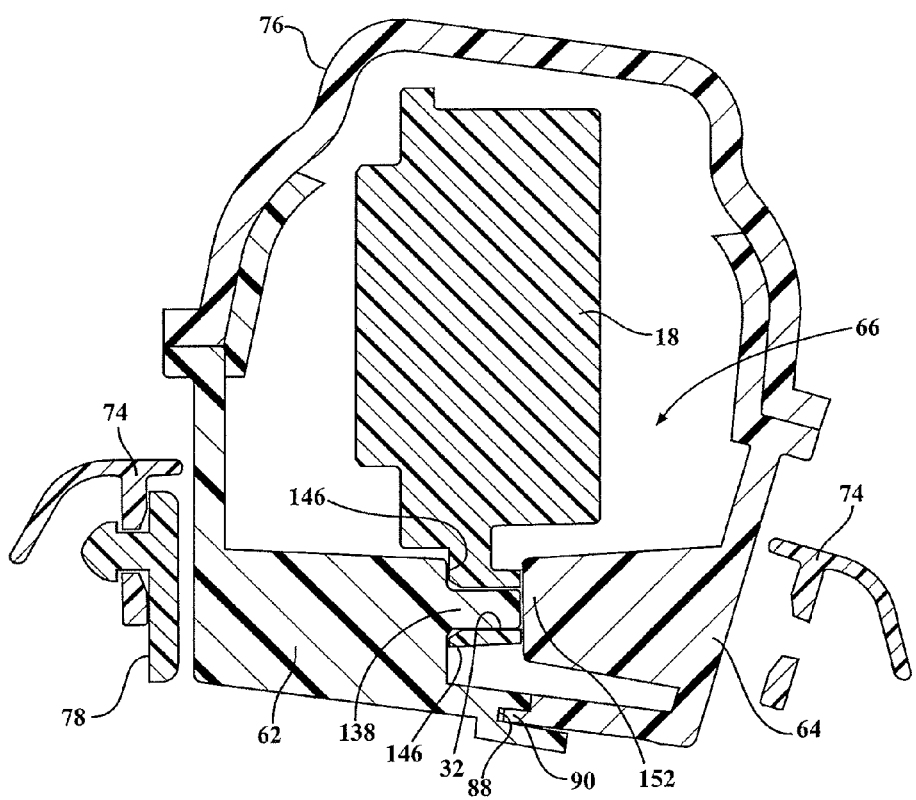
FIG. 19 is a sectional view taken along lines 19-19 of FIG. 17.

The first piece 62 also includes a groove 88 substantially extending circumferentially around the first piece 62, best shown in FIG. 14A, which receives a corresponding lip 90 extending circumferentially around the second piece 64, best seen in FIG. 14B. The lip 90 received into the groove 88 provides for proper positioning between the two pieces 62,64.

While is has been shown with regard to the above embodiments that the bracket 10 has two pieces 12,14, it is within the scope of the invention that the bracket 10 may be made of different configurations. Other embodiments may include a single piece bracket 10 having a cover for securing the actuator 18, a two-piece bracket 10 where one part is larger than the other, and makes up a greater portion of the bracket 10, a three-piece bracket 10, or other types of pieces that may be designed for a specific application.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A bracket used for an active grille, comprising:
a first piece;
a second piece selectively assembled to said first piece;
a cavity formed by the connection of said first piece to said second piece;
a plurality of attachment features securing the connection between said first piece and said second piece;
an actuator secured in said cavity, said actuator coupled to one or more louvers for controlling the rotation of said one or more louvers; and
a plurality of alignment features extending into said cavity and contacting said actuator to position said actuator in said cavity during assembly of said first piece and said second piece, and said actuator is positionally secured in said cavity.

2. The bracket used for an active grille of claim 1, further comprising:
a groove integrally formed as part of said first piece; and
a lip integrally formed as part of said second piece;
wherein said lip is received into said groove when said first piece is connected to said second piece, aligning said first piece with said second piece.

3. The bracket used for an active grille of claim 1, said plurality of alignment features is a first plurality of alignment features, each of said first plurality of alignment features further comprising:
a first projection integrally formed with said first piece; and
a second projection integrally formed with said second piece;
wherein said first projection and said second projection contact said actuator such that first projection and said second projection support said actuator in said housing.

4. The bracket used for an active grille of claim 3, further comprising a second plurality of alignment features for positioning said actuator in said cavity.

5. The bracket used for an active grille of claim 4, said second plurality of alignment features further comprising:
a third projection integrally formed with said first piece;
a recessed portion formed as part of said third projection;
a fourth projection integrally formed with said second piece; and
a tapered portion formed as part of said fourth projection;
wherein at least a portion of said fourth projection extends into a first of said plurality of apertures formed as part of said actuator such that third projection contacts said fourth projection, and at least a portion of said tapered portion is received by said recess, retaining said actuator in said housing.

6. The bracket used for an active grille of claim 4, further comprising a third plurality of alignment features for positioning said actuator in said cavity.

7. The bracket used for an active grille of claim 6, said third plurality of alignment features further comprising:
a fifth projection integrally formed with said first piece; and
a sixth projection integrally formed with said second piece;
wherein at least a portion of said sixth projection extends into a second of said plurality of apertures formed as part of said actuator such that fifth projection contacts said sixth projection, preventing the rotation of said actuator relative to said bracket.

8. The bracket used for an active grille of claim 6, further comprising a fourth plurality of alignment features for positioning said actuator in said cavity.

9. The bracket used for an active grille of claim 8, said fourth plurality of alignment features further comprising:
a seventh projection having a single flange, said seventh projection integrally formed with said first piece; and
an eighth projection integrally formed with said second piece;
wherein at least a portion of said single flange extends into a third of said plurality of apertures formed as part of said actuator such that said single flange contacts said eighth projection, locating said actuator in said cavity.

10. The bracket used for an active grille of claim 1, further comprising a plurality of side apertures for supporting said one or more louvers.

11. The bracket used for an active grille of claim 10, wherein a portion of said side aperture are formed as part of said first piece, and a portion of said side apertures are formed as part of said second piece.

12. The bracket used for an active grille of claim 1, each of said plurality of attachment features further comprising:
a projection formed as part of said first piece; and
a slot formed as part of said second piece;
wherein at least a portion of said projection extends through said slot when said first piece is connected to said second piece, securing said first piece to said second piece.

13. The bracket used for an active grille of claim 1, further comprising:
an upper tab formed as part of said first piece;
a lower tab formed as part of said first piece; and
wherein said bracket is attached to a frame of a grille using a fastener inserted through said upper tab, and another fastener inserted through said lower tab.

14. The bracket used for an active grille of claim 11, wherein said actuator is concealed when said first piece is connected to said second piece, and said first piece and said second piece are connected to a frame.

15. A bracket for receiving an actuator used to operate an active grille, comprising:
   a first half;
   a second half;
   a cavity, a portion of said cavity formed by said first half, and a portion of said cavity formed by said second half when said first half is connected to said second half;
   a plurality of attachment features for connecting said first half to said second half;
   an actuator disposed and supported in said cavity when said first half is connected to said second half;
   a first plurality of alignment features for orienting said actuator in said cavity such that when said first half is connected to said second half, said actuator is disposed in said cavity and secured by said first plurality of alignment features; and
   a second plurality of alignment features for orienting said actuator in said cavity such that when said first half is connected to said second half, said actuator is disposed in said cavity and secured by said second plurality of alignment features.

16. The bracket for an active grille of claim 15, further comprising:
   a groove integrally formed as part of said first half; and
   a lip integrally formed as part of said second half;
   wherein said lip is received into said groove when said first half is connected to said second half, aligning said first half with said second half.

17. The bracket for an active grille of claim 15, said first plurality of alignment features further comprising:
   a first projection integrally formed with said first half; and
   a second projection integrally formed with said second half;
   wherein said first projection and second projection contact said actuator when said first half is connected to said second half, supporting said actuator in said cavity.

18. The bracket for an active grille of claim 15, said second plurality of alignment features further comprising:
   a third projection integrally formed with said first half; and
   a fourth projection integrally formed with said second half such that said fourth projection at least partially extends into a first of said plurality of apertures formed as part of said actuator;
   wherein said third projection contacts said fourth projection when said first half is connected to said second half, retaining said actuator in said cavity.

19. The bracket for an active grille of claim 18, further comprising:
   a recessed portion formed as part of said third projection; and
   a tapered portion formed as part of said fourth projection;
   wherein at least a portion of said tapered portion is received by said recessed portion when said first half is connected to said second half.

20. The bracket for an active grille of claim 15, further comprising a third plurality of alignment features, comprising:
   a fifth projection integrally formed with said first piece; and
   a sixth projection integrally formed with said second piece;
   wherein at least a portion of sixth projection extends into a second of said plurality of apertures formed as part of said actuator such that fifth projection contacts said sixth projection, preventing the rotation of said actuator relative to said bracket.

21. The bracket for an active grille of claim 20, further comprising a fourth plurality of alignment features, comprising:
   a seventh projection having a single flange, said seventh projection integrally formed with said first piece; and
   an eighth projection integrally formed with said second piece;
   wherein at least a portion of said single flange extends into a third of said plurality of apertures formed as part of said actuator such that said single flange contacts said eighth projection, locating said actuator in said cavity.

22. The bracket for an active grille of claim 15, further comprising a plurality of side apertures operable for supporting said one or more louvers, a portion of said plurality of side apertures formed as part of said first half, and a portion of said plurality of side apertures formed as part of said second half.

23. The bracket for an active grille of claim 15, each of said plurality of attachment features further comprising:
   a projection integrally formed with said first half; and
   a slot integrally formed with said second half such that when said projection is extended through said slot, said first half is connected to said second half.

24. The bracket used for an active grille of claim 15, further comprising:
   an upper tab formed as part of said first half;
   a lower tab formed as part of said first half; and
   wherein said bracket is attached to a frame of a grille using a fastener inserted through said upper tab, and another fastener inserted through said lower tab.

25. The bracket used for an active grille of claim 15, wherein said actuator is concealed when said first piece is connected to said second piece, and said first piece and said second piece are connected to a frame.

26. A bracket for receiving an actuator used to operate an active grille, comprising:
   a first half;
   a second half selectively connected to said first half;
   a plurality of attachment features for connecting said first half to said second half;
   a cavity formed when said first half is connected to said second half;
   an actuator disposed in said cavity operable for actuating one or more louvers;
   a first plurality of alignment features for providing proper alignment of said actuator in said cavity;
   a second plurality of alignment features for providing proper alignment of said actuator in said cavity;
   a groove formed as part of said first half;
   a lip formed as part of said second half such that said lip is at least partially disposed in said groove when said first half is connected to said second half; and
   a plurality of side apertures operable for supporting said one or more louvers, a portion of said plurality of side apertures formed as part of said first half, and a portion of said plurality of side apertures formed as part of said second half.

27. The bracket for an active grille of claim 26, said first plurality of alignment features further comprising:
   a first projection formed as part of said first half; and
   a second projection formed as part of said second half;
   wherein said second projection is in substantial alignment with said first projection such that when said first half is connected to said second half, said first projection said second projection contact said actuator, supporting said actuator in said cavity.

28. The bracket for an active grille of claim 27, said second plurality of alignment features further comprising:
   a third projection formed as part of said first half;
   a recessed portion formed as part of said third projection;
   a fourth projection formed as part of said second half, said fourth projection at least partially extends into one said plurality of apertures formed as part of said actuator when said first half is connected to said second half; and
   a tapered portion formed as part of said fourth projection;
   wherein said tapered portion is at least partially received into said recessed portion when said first half is connected to said second half, retaining said actuator in said cavity.

29. The bracket used for an active grille of claim 28, further comprising a third plurality of alignment features for positioning said actuator in said cavity said third plurality of alignment features comprising:
   a fifth projection integrally formed with said first piece; and
   a sixth projection integrally formed with said second piece;
   wherein at least a portion of said sixth projection extends into another of said plurality of apertures formed as part of said actuator such that fifth projection contacts said sixth projection, preventing the rotation of said actuator relative to said bracket.

30. The bracket used for an active grille of claim 29, further comprising a fourth plurality of alignment features for positioning said actuator in said cavity said fourth plurality of alignment features further comprising:
   a seventh projection having a single flange, said seventh projection integrally formed with said first piece; and
   an eighth projection integrally formed with said second piece;
   wherein at least a portion of said single flange extends into another of said plurality of apertures formed as part of said actuator such that said single flange contacts said eighth projection, locating said actuator in said cavity.

31. The bracket for an active grille of claim 26, each of said plurality of attachment features further comprising:
   a slot formed as part of said second half; and
   a projection formed as part of said first half;
   wherein said projection at least partially extends into said slot when said first half is connected to said second half, securing said first half to said second half.

32. The bracket for an active grille of claim 26, further comprising:
   an upper tab formed as part of said first half;
   a lower tab formed as part of said second half; and
   wherein said bracket is attached to a frame of a grille using a fastener inserted through said upper tab, and another fastener inserted through said lower tab.

33. The bracket used for an active grille of claim 26, wherein said actuator is concealed when said first piece is connected to said second piece, and said first piece and said second piece are connected to a frame.

* * * * *